(12) United States Patent
Gu et al.

(10) Patent No.: US 8,792,223 B2
(45) Date of Patent: Jul. 29, 2014

(54) MULTILAYER CERAMIC ELECTRONIC COMPONENT

(75) Inventors: Hyun Hee Gu, Gyunggi-do (KR);
Myung Jun Park, Gyunggi-do (KR);
Kyu Ha Lee, Gyunggi-do (KR); Da Young Choi, Gyunggi-do (KR); Jae Young Park, Gyunggi-do (KR); Sang Hoon Kwon, Gyunggi-do (KR); Byung Jun Jeon, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 35 days.

(21) Appl. No.: 13/620,614

(22) Filed: Sep. 14, 2012

(65) Prior Publication Data

US 2014/0002949 A1  Jan. 2, 2014

(30) Foreign Application Priority Data

Jun. 28, 2012  (KR) ........................ 10-2012-0070259

(51) Int. Cl.
*H01G 4/005* (2006.01)
*H01G 4/00* (2006.01)

(52) U.S. Cl.
USPC .......................... 361/303; 361/301.1; 361/305

(58) Field of Classification Search
USPC ................................................. 361/303, 305
See application file for complete search history.

(56) References Cited

U.S. PATENT DOCUMENTS

| 2009/0303655 A1* | 12/2009 | Ogawa et al. | 361/301.4 |
| 2011/0157767 A1* | 6/2011 | Hur et al. | 361/305 |
| 2012/0147516 A1* | 6/2012 | Kim et al. | 361/301.4 |

FOREIGN PATENT DOCUMENTS

| JP | 2000-077258 A | 3/2000 |
| JP | 2005-150659 A | 6/2005 |

* cited by examiner

*Primary Examiner* — Jayprakash N Gandhi
*Assistant Examiner* — Dion R Ferguson
(74) *Attorney, Agent, or Firm* — McDermott Will & Emery LLP

(57) ABSTRACT

There is provided a multilayer ceramic electronic component including: a ceramic body including a dielectric layer; a plurality of internal electrodes disposed within the ceramic body to face each other, having the dielectric layer interposed therebetween; and external electrodes electrically connected to the plurality of internal electrodes, wherein the ceramic body includes an active layer corresponding to a capacitance forming part and a cover layer formed on at least one of an upper surface and a lower surface of the active layer and corresponding to a non-capacitance forming part, an average thickness of the cover layer is 15 μm or less, the external electrodes include a conductive metal and glass portions, and when an average length of the glass portions in a length direction of the external electrodes is Ls, Ls≤10 μm is satisfied.

14 Claims, 6 Drawing Sheets

MULTILAYER CERAMIC ELECTRONIC COMPONENT

CROSS-REFERENCE TO RELATED APPLICATIONS

This application claims the priority of Korean Patent Application No. 10-2012-0070259 filed on Jun. 28, 2012, in the Korean Intellectual Property Office, the disclosure of which is incorporated herein by reference.

BACKGROUND OF THE INVENTION

1. Field of the Invention

The present invention relates to a multilayer ceramic electronic component having improved reliability by preventing the permeation of a plating solution thereinto.

2. Description of the Related Art

In accordance with the recent trend for the miniaturization of electronic products, demand for a small multilayer ceramic electronic component having high capacitance has increased.

In accordance with the demand for a small multilayer ceramic electronic component having high capacitance, an external electrode of the multilayer ceramic electronic component has also been thinned.

An external electrode paste contains a conductive metal such as copper (Cu) as a main material to thereby ensure chip sealing properties and electrical conductivity between the external electrode and a chip and contains glass as an auxiliary material to provide adhesion between the external electrode and the chip while simultaneously filling voids when the metal undergoes sintering shrinkage.

However, in the case in which a content of glass in the external electrode paste is insufficient, chip sealing properties may be ineffective. In the case of adding an excessive amount of glass to the external electrode paste in order to enhance chip sealing properties, a defect such as a plating defect may occur due to the elution of glass to a surface of the sintered external electrode.

Particularly, in accordance with thinness of the external electrode, it may be difficult to implement a desired level of compactness, and the possibility that a defect may occur due to a lack of or an excess of glass, owing to high temperature behavior characteristics thereof, may increase.

In addition, in the case in which a shape of the external electrode is irregular, a possibility that a plating solution may permeate through a relatively thin portion of the external electrode may be significantly increased, such that there may be a problem in securing reliability.

RELATED ART DOCUMENT(S)

(Patent Document 1) Japanese Patent Laid-Open Publication No. JP 2000-077258
(Patent Document 2) Japanese Patent Laid-Open Publication No. JP 2005-150659

SUMMARY OF THE INVENTION

An aspect of the present invention provides a multilayer ceramic electronic component having improved reliability by preventing the permeation of a plating solution thereinto.

According to an aspect of the present invention, there is provided a multilayer ceramic electronic component including: a ceramic body including a dielectric layer; a plurality of internal electrodes disposed within the ceramic body to face each other, having the dielectric layer interposed therebetween; and external electrodes electrically connected to the plurality of internal electrodes, wherein the ceramic body includes an active layer corresponding to a capacitance forming part and a cover layer formed on at least one of an upper surface and a lower surface of the active layer and corresponding to a non-capacitance forming part, an average thickness of the cover layer in a cross-section of the ceramic body in length and thickness directions taken in a central portion of the ceramic body in a width direction is 15 μm or less, the external electrodes include a conductive metal and glass portions, and when an average length of the glass portions in a length direction of the external electrodes is Ls, Ls≤10 μm is satisfied.

When a thickness of the external electrode in the central portion of the ceramic body in the thickness direction is Tc and a thickness of the external electrode at a point spaced apart from a central portion of the capacitance forming part by a distance equal to 25% of a length of the ceramic body in the thickness direction is T1, T1/Tc≥0.8 may be satisfied.

When a thickness of the external electrode in the central portion of the ceramic body in the thickness direction is Tc and a thickness of the external electrode at the outermost point of the capacitance forming part at which the plurality of internal electrodes are formed is T2, T2/Tc≥0.5 may be satisfied.

The glass portions may include glass particles having an average particle diameter of 2 μm or less.

The conductive metal may be at least one selected from a group consisting of copper (Cu), nickel (Ni), silver (Ag), and silver-palladium (Ag—Pd).

The glass portions may have insulating properties.

According to another aspect of the present invention, there is provided a multilayer ceramic electronic component including: a ceramic body including a dielectric layer; a plurality of internal electrodes disposed within the ceramic body to face each other, having the dielectric layer interposed therebetween; and external electrodes electrically connected to the plurality of internal electrodes, wherein the ceramic body includes an active layer corresponding to a capacitance forming part and a cover layer formed on at least one of an upper surface and a lower surface of the active layer and corresponding to a non-capacitance forming part, an average thickness of the cover layer in a cross-section of the ceramic body in length and thickness directions taken in a central portion of the ceramic body in a width direction is 15 μm or less, the external electrodes include a conductive metal and glass portions, and when a 50% value of cumulative distribution of areas occupied by the glass portions in the external electrodes is D50 and a 90% value of cumulative distribution of the areas is D90, 0.1≤D50/D90≤0.8 is satisfied.

When a thickness of the external electrode in the central portion of the ceramic body in the thickness direction is Tc and a thickness of the external electrode at a point spaced apart from a central portion of the capacitance forming part by a distance equal to 25% of a length of the ceramic body in the thickness direction is T1, T1/Tc≥0.8 may be satisfied.

When a thickness of the external electrode in the central portion of the ceramic body in the thickness direction is Tc and a thickness of the external electrode at the outermost point of the capacitance forming part at which the plurality of internal electrodes are formed is T2, T2/Tc≥0.5 may be satisfied.

The glass portions may include glass particles having an average particle diameter of 2 μm or less.

The conductive metal may be at least one selected from a group consisting of copper (Cu), nickel (Ni), silver (Ag), and silver-palladium (Ag—Pd).

The glass portions may have insulating properties.

According to another aspect of the present invention, there is provided a multilayer ceramic electronic component including: a ceramic body including a dielectric layer; a plurality of internal electrodes disposed within the ceramic body to face each other, having the dielectric layer interposed therebetween; and external electrodes electrically connected to the plurality of internal electrodes, wherein the ceramic body includes an active layer corresponding to a capacitance forming part and a cover layer formed on at least one of an upper surface and a lower surface of the active layer and corresponding to a non-capacitance forming part, an average thickness of the cover layer in a cross-section of the ceramic body in length and thickness directions taken in a central portion of the ceramic body in a width direction is 15 μm or less, the external electrodes include a conductive metal and glass portions, when an average length of the glass portions in a length direction of the external electrodes is Ls, Ls≤10 μm is satisfied, and when a 50% value of cumulative distribution of areas occupied by the glass portions in the external electrodes is D50 and a 90% value of cumulative distribution of the areas is D90, 0.1≤D50/D90≤0.8 is satisfied.

When a thickness of the external electrode in the central portion of the ceramic body in the thickness direction is Tc and a thickness of the external electrode at a point spaced apart from a central portion of the capacitance forming part by a distance equal to 25% of a length of the ceramic body in the thickness direction is T1, T1/Tc≥0.8 may be satisfied.

When a thickness of the external electrode in the central portion of the ceramic body in the thickness direction is Tc and a thickness of the external electrode at the outermost point of the capacitance forming part at which the plurality of internal electrodes are formed is T2, T2/Tc≥0.5 may be satisfied.

The glass portions may include glass particles having an average particle diameter of 2 μm or less.

The glass portions may have insulating properties.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
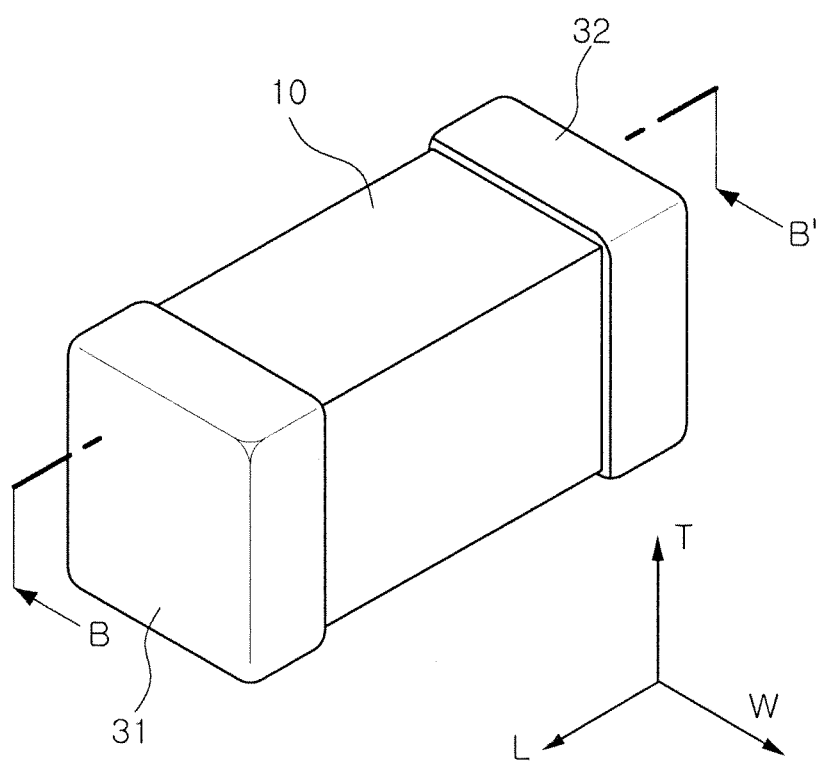
FIG. 1 is a perspective view schematically showing a multilayer ceramic capacitor according to first to sixth embodiments of the present invention.

Embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a perspective view schematically showing a multilayer ceramic capacitor according to first through sixth embodiments of the present invention.

Figure 2:
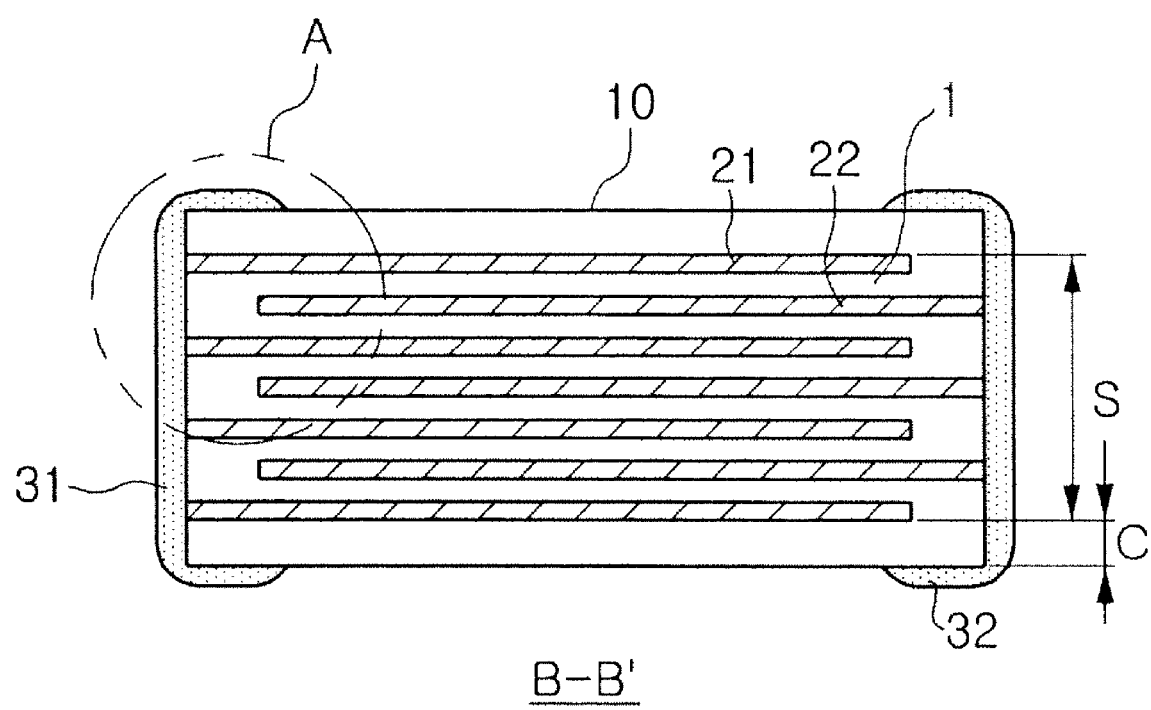
FIG. 2 is a cross-sectional view taken along line B-B' of FIG. 1.

FIG. 2 is a cross-sectional view taken along line B-B' of FIG. 1.

Figure 3:
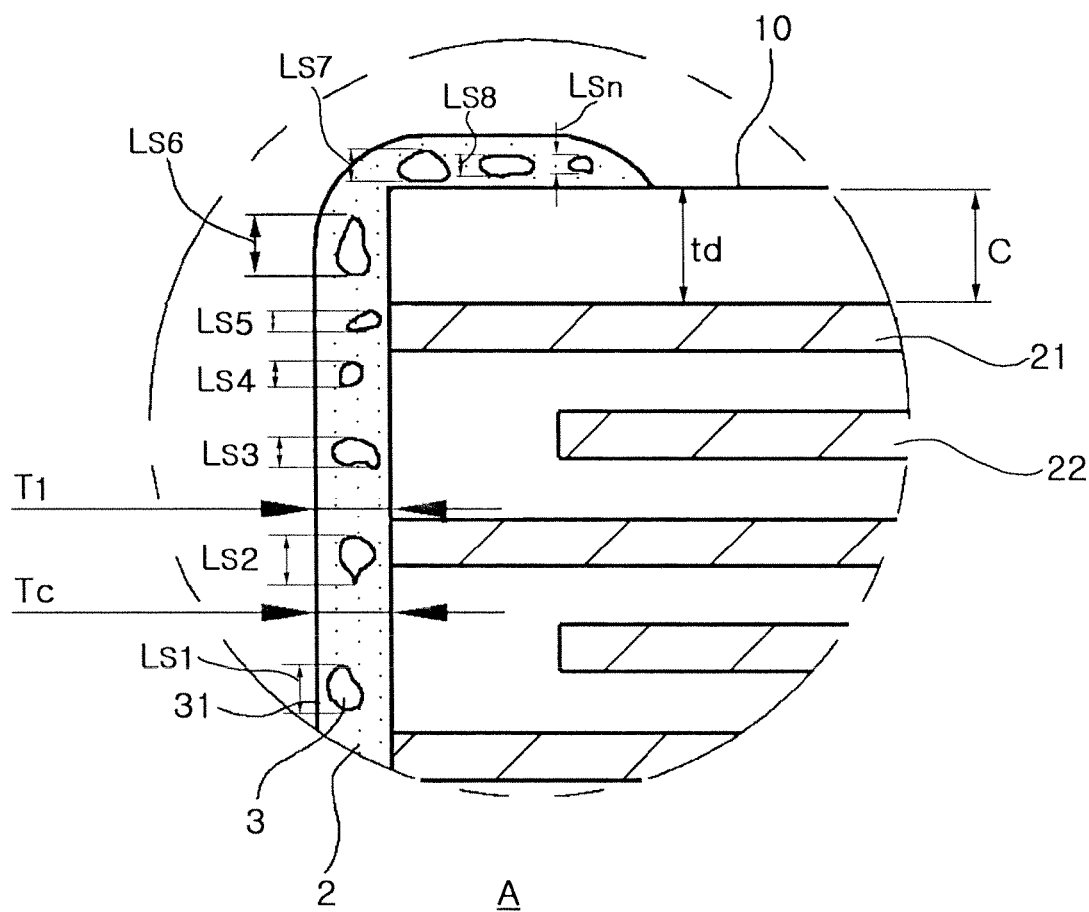
FIG. 3 is an enlarged view of part A of FIG. 2 according to the first embodiment of the present invention.

FIG. 3 is an enlarged view of part A of FIG. 2 according to the first embodiment of the present invention.

Referring to FIGS. 1 through 3, a multilayer ceramic electronic component according to the first embodiment of the present invention may include: a ceramic body 10 including a dielectric layer 1; a plurality of internal electrodes 21 and 22 disposed within the ceramic body 10 to face each other, having the dielectric layer 1 interposed therebetween; and external electrodes 31 and 32 electrically connected to the plurality of internal electrodes 21 and 22, wherein the ceramic body 10 includes an active layer corresponding to a capacitance forming part and a cover layer C formed on at least one of an upper surface and a lower surface of the active layer and corresponding to a non capacitance forming part, an average thickness td of the cover layer C in a cross-section of the ceramic body 10 in length and thickness (L-T) directions taken in a central portion of the ceramic body 10 in a width (W) direction thereof is 15 μm or less, the external electrodes 31 and 32 include a conductive metal 2 and a glass portion 3, and when an average length of the glass portion 3 in a length direction of the external electrodes 31 and 32 is LS, Ls≤10 μm may be satisfied.

Hereinafter, the multilayer ceramic electronic component according to the first embodiment of the present invention will be described. In particular, a multilayer ceramic capacitor will be described. However, the present invention is not limited thereto.

In a multilayer ceramic capacitor according to an embodiment of the present invention, a 'length direction' refers to an 'L' direction of FIG. 1; a 'width direction' refers to a 'W' direction of FIG. 1; and a 'thickness direction' refers to a 'T' direction of FIG. 1. Here, the 'thickness direction' refers to a direction in which dielectric layers are laminated, that is, a 'lamination direction'.

According to the embodiment of the present invention, a raw material for forming the dielectric layer 1 is not particularly limited as long as a sufficient amount of capacitance can be obtained therewith. For example, barium titanate ($BaTiO_3$) powder may be used therefor.

As a material for forming the dielectric layer 1, various ceramic additives, organic solvents, plasticizers, binders, dispersants, or the like may be added to powder such as the barium titanate ($BaTiO_3$) powder or the like, depending on the purpose of the present invention.

A material for forming the plurality of internal electrodes 21 and 22 is not specifically limited, but may be a conductive paste made of at least one of, for example, silver (Ag), lead (Pg), platinum (Pt), nickel (Ni), and copper (Cu).

The multilayer ceramic capacitor according to the first embodiment of the present invention may include the external electrodes 31 and 32 electrically connected to the plurality of internal electrodes 21 and 22.

According to the first embodiment, the ceramic body may include an active layer corresponding to a capacitance forming part and a cover layer C formed on at least one of an upper surface and a lower surface of the active layer and corresponding to a non-capacitance forming part, and an average thickness td of the cover layer C in a cross-section of the ceramic body 10 in length and thickness (L-T) directions taken in a central portion of the ceramic body 10 in a width (W) direction thereof may be 15 μm or less.

The active layer corresponding to the capacitance forming part may be a region in which the plurality of internal electrodes 21 and 22 overlap each other within the ceramic body 10.

The average thickness td of the cover layer C may be measured from an image obtained by scanning a cross-section of the multilayer ceramic capacitor in a length direction using a scanning electron microscope (SEM), as shown in FIG. 2.

More specifically, the average thickness td of the cover layer C may be obtained by measuring thicknesses of the cover layer C at certain points of the cross-section of the cover layer C extracted from the image obtained by scanning the cross section of the multilayer ceramic capacitor in the length and thickness (L-T) directions taken in the central portion of the multilayer ceramic capacitor in the width (W) direction thereof using the SEM, as shown in FIG. 2.

In general, in the case in which the average thickness td of the cover layer C in the cross-section of the ceramic body in the length and thickness (L-T) directions taken in the central portion of the ceramic body in the width (W) direction is 15 μm or less, a possibility in which a plating solution permeates into the multilayer ceramic capacitor may be increased.

However, according to the first to third embodiments of the present invention to be described below, the plating solution is not permeated even in the case in which the average thickness td of the cover layer C is 15 μm or less, such that a multilayer ceramic electronic component having excellent reliability may be implemented.

Meanwhile, in the case in which the average thickness td of the cover layer C exceeds 15 μm, the average thickness of the cover layer C is thick, such that the plating solution may not be permeated.

In addition, the external electrodes 31 and 32 may include the conductive metal 2 and the glass portion 3.

The conductive metal 2 is not specifically limited, but may be, for example, at least one selected from a group consisting of copper (Cu), nickel (Ni), silver (Ag), and sliver-palladium (Ag—Pd).

The glass portion 3 may be formed of insulating glass, but is not limited thereto.

The external electrodes 31 and 32 may include the conductive metal 2 and the glass portion 3, and when the average length of the glass portions 3 in the length direction of the external electrodes is LS, Ls≤10 μm may be satisfied. The average length Ls of the glass portions 3 in the length direction of the external electrodes 31 and 32 may be measured from the image obtained by scanning the cross-section of the ceramic body 10 in the length direction using a scanning electron microscope (SEM), as shown in FIG. 2.

More specifically, the average length Ls of the glass portions 3 in the length direction of the external electrodes 31 and 32 may be obtained by measuring lengths of the glass portions 3 in the length direction of the external electrodes 31 and 32, in the cross-section of the external electrode extracted from the image obtained by scanning the cross section of the ceramic body 10 in the length and thickness (L-T) directions taken in the central portion of the ceramic body 10 in the width (W) direction using the SEM, as shown in FIG. 2.

The average length Ls of the glass portions 3 in the length direction of the external electrodes may be obtained by measuring lengths (Ls1, Ls2, Ls3, . . . , and Lsn) of respective glass portions in the length direction of the external electrodes, distributed in the cross-section of the external electrode and calculating an average value of the lengths of the respective glass portions.

The lengths (Ls1, Ls2, Ls3, . . . , and Lsn) of the respective glass portions 3 in the length direction may be measured as a distance between the uppermost point of a respective glass portion and the lowermost point thereof in the length direction.

The average length Ls of the glass portions 3 in the length direction of the external electrodes 31 and 32 satisfies Ls≤10 μm, such that the permeation of the plating solution may be prevented, thereby implementing a multilayer ceramic capacitor having excellent reliability.

That is, the average length of the glass portions is controlled to be 10 μm or less, such that the glass portions may be uniformly distributed in the external electrode to thereby improve compactness of the external electrode, thereby preventing the permeation of the plating solution.

In the case in which the average length of the glass portions exceeds 10 μm, the average length of the glass portion is long, such that pores may be generated, and the plating solution may be permeated to the external electrodes due to the pores formed therein.

According to the first embodiment of the present invention, an average particle diameter of glass particles included in the glass portion 3 may be 2 μm or less so that the average length Ls of the glass portions 3 in the length direction of the external electrodes 31 and 32 satisfies Ls≤10 μm. However, the present invention is not limited thereto.

That is, fine glass particles having an average particle diameter of 2 μm or less are used, such that the average length of the glass portions 3 may be controlled to be 10 μm or less in the external electrodes, whereby the compactness of the external electrodes may be improved to prevent the permeation of the plating solution.

Therefore, the fine glass particles having the average particle diameter of 2 μm or less are used, such that the average length of the glass portions 3 in the external electrodes may be controlled to be 10 μm or less, whereby a multilayer ceramic electronic component having excellent reliability may be implemented.

In the case in which the average particle diameter of the glass particles of the glass portion 3 exceeds 2 μm, since the average particle diameter is large, the average length of the glass portions 3 in the external electrodes may not be controlled to be 10 μm or less, such that the pores may be generated in the external electrodes, and the plating solution may permeate through the pores.

According to the first embodiment of the present invention, when a thickness of each external electrode 31 and 32 in the central portion of the ceramic body 10 in the thickness direction thereof is Tc, and a thickness of each external electrode 31 and 32 at a point spaced apart from a central portion of the capacitance forming part by a distance equal to 25% of a length S of the ceramic body 10 in the thickness direction is T1, T1/Tc≥0.8 may be satisfied.

The thickness Tc of each external electrode 31 and 32 in the central portion of the ceramic body 10 in the thickness direction refers to a thickness of each external electrode at a point at which an imaginary line is drawn through the ceramic body 10 in the length direction thereof at a central portion point of the ceramic body 10 in the thickness direction.

Meanwhile, the central portion of the capacitance forming part in which the plurality of internal electrodes 21 and 22 are laminated to contribute to forming capacitance refers to a central portion of the capacitance forming part in the thickness direction of the ceramic body 10.

The capacitance forming part may be a region in which the plurality of internal electrodes 21 and 22 overlap each other within the ceramic body 10.

The thickness T1 of each external electrode 31 and 32 at the point spaced apart from the central portion of the capacitance forming part by the distance equal to 25% of the length S of the ceramic body 10 in the thickness direction refers to a thickness of each external electrode at a point at which an imaginary line is drawn through the ceramic body 10 in the length direction thereof at the point spaced apart from the central portion of the capacitance forming part by the distance equal to 25% of the length S.

According to the first embodiment of the present invention, a relationship between Tc and T1, T1/Tc≥0.8 may be satisfied.

A ratio of T1 to Tc satisfies 0.8 or more to thereby decrease deviation between the thickness Tc of the external electrode in the central portion of the ceramic body 10 in the thickness direction and the thickness T1 of the external electrode at the point spaced apart from the central portion of the capacitance forming part in which the internal electrodes are laminated to contribute to forming the capacitance by the distance equal to 25% of the Length (S) of the ceramic body 10 in the thickness direction, whereby the deterioration of reliability may be prevented.

In the case in which the ratio of T1 to Tc is less than 0.8, since the deviation in the thickness of the external electrode is large, the plating solution may permeate into a relatively thin portion of the external electrode, such that reliability may be deteriorated.

The thicknesses of the external electrodes 31 and 32 may be measured from the image obtained by scanning the cross-section of the multilayer ceramic capacitor in the length direction using the SEM, as shown in FIG. 2.

More specifically, the thicknesses of the external electrode may be obtained by measuring thicknesses of the external electrode at certain points of the cross section of the external electrode extracted from the image obtained by scanning the cross section of the multilayer ceramic capacitor in the length and thickness (L-T) directions taken in the central portion of the multilayer ceramic capacitor in the width (W) direction using the SEM, as shown in FIG. 2.

Figure 4:
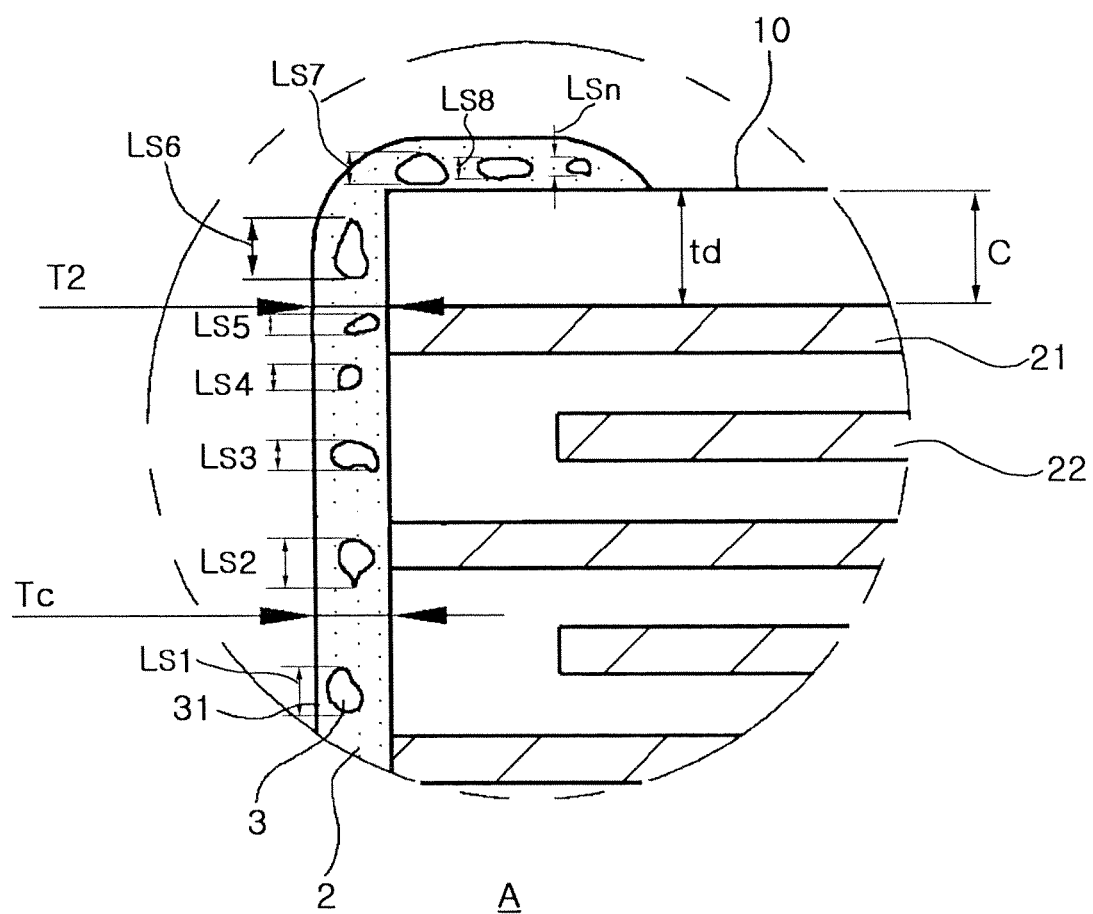
FIG. 4 is an enlarged view of part A of FIG. 2 according to the second embodiment of the present invention.

FIG. 4 is an enlarged view of part A of FIG. 2 according to the second embodiment of the present invention.

Referring to FIG. 4, in a multilayer ceramic electronic component according to the second embodiment of the present invention, an average thickness td of the cover layer C in the cross-section of the ceramic body 10 in the length and thickness (L-T) directions taken in the central portion of the ceramic body 10 in the width (W) direction is 15 μm or less, the external electrodes 31 and 32 include the conductive metal 2 and the glass portions 3, when an average length of the glass portions 3 in the length direction of the external electrodes 31 and 32 is LS, Ls≤10 μm is satisfied, and when a thickness of the external electrodes 31 and 32 in the central portion of the ceramic body 10 in the thickness direction is Tc and a thickness of the external electrodes 31 and 32 at the outermost point of the capacitance forming part at which the plurality of internal electrodes 21 and 22 are formed is T2, T2/Tc≥0.5 is satisfied.

The thickness T2 of each external electrode 31 and 32 at the outermost point of the capacitance forming part at which the plurality of internal electrodes 21 and 22 are formed refers to a thickness of each external electrode at a point at which an imaginary line is drawn through the ceramic body 10 in the length direction thereof at the outermost point at which the plurality of internal electrodes 21 and 22 are formed.

A ratio of T2 to Tc satisfies 0.5 or more to thereby decrease deviation between the thickness Tc of each external electrode 31 and 32 in the central portion of the ceramic body 10 in the thickness direction and the thickness T2 of each external electrode 31 and 32 at the outermost point at which the plurality of internal electrodes 21 and 22 are formed, whereby the deterioration of reliability may be prevented.

In the case in which the ratio of T2 to Tc is less than 0.5, since the deviation in the thickness of the external electrode is large, the plating solution may permeate into a relatively thin portion of the external electrode, such that reliability may be deteriorated.

Since the other characteristics of the multilayer ceramic electronic component according to the second embodiment of the present invention are the same as those of the multilayer ceramic electronic component according to the first embodiment, a description thereof will be omitted.

Figure 5:
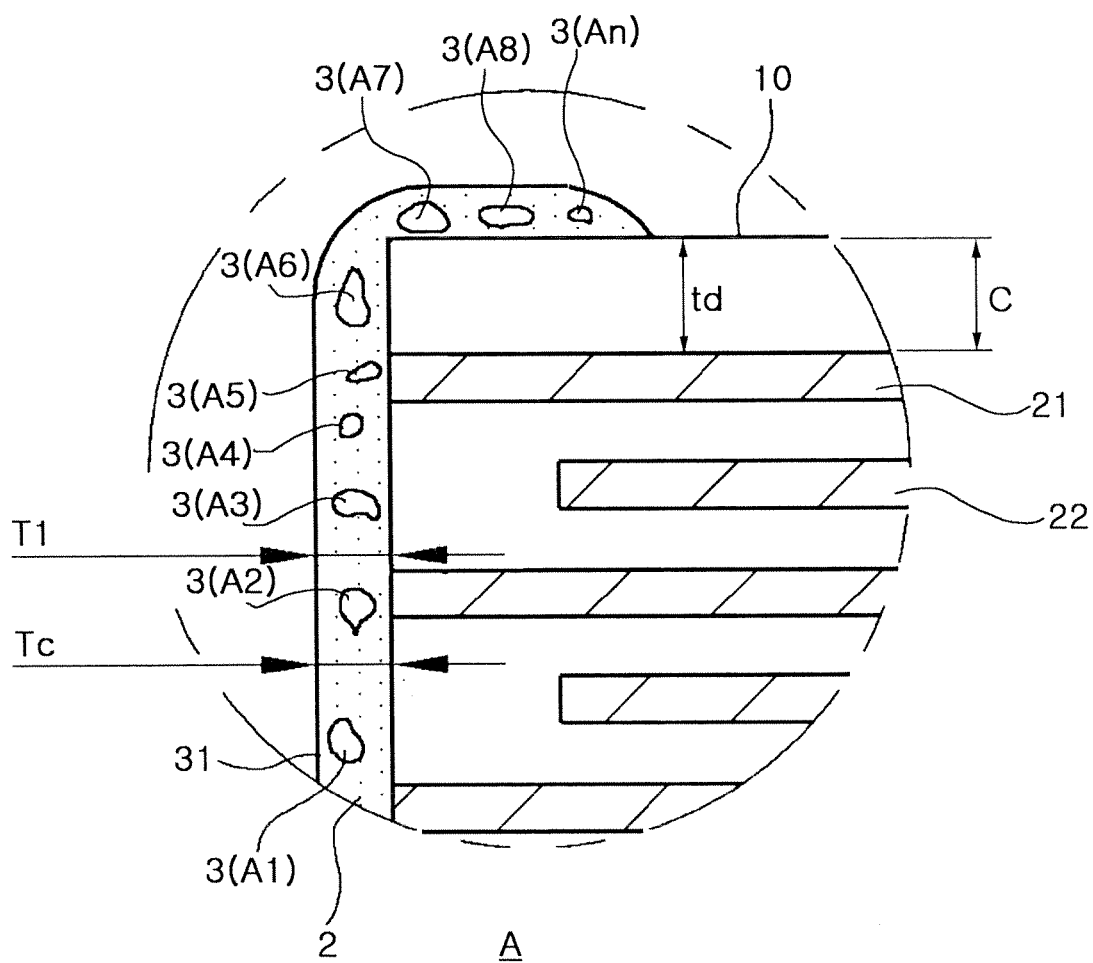
FIG. 5 is an enlarged view of part A of FIG. 2 according to the third embodiment of the present invention.

FIG. 5 is an enlarged view of part A of FIG. 2 according to the third embodiment of the present invention.

Referring to FIG. 5, a multilayer ceramic electronic component according to the third embodiment of the present invention may include: a ceramic body 10 including a dielectric layer 1; a plurality of internal electrodes 21 and 22 disposed within the ceramic body 10 to face each other, having the dielectric layer 1 interposed therebetween; and external electrodes 31 and 32 electrically connected to the plurality of internal electrodes 21 and 22, wherein the ceramic body 10 includes an active layer corresponding to a capacitance forming part and a cover layer C formed on at least one of an upper surface and a lower surface of the active layer and corresponding to a non-capacitance forming part, an average thickness td of the cover layer C in a cross-section of the ceramic body 10 in length and thickness (L-T) directions taken in a central portion of the ceramic body 10 in a width (W) direction thereof is 15 μm or less, the external electrodes 31 and 32 include a conductive metal 2 and glass portions 3, and when areas of the external electrodes 31 and 32 occupied by the glass portions 3 are A1, A2, . . . , and An and a 50% value of cumulative distribution of the areas is D50 and a 90% value of cumulative distribution of the areas is D90, 0.1≤D50/D90≤0.8 is satisfied.

In the multilayer ceramic electronic component according to the third embodiment of the present invention, in the case in which the areas of the external electrodes 31 and 32 occupied by the glass portions 3 are A1, A2, . . . , and An, when a 50% value of cumulative distribution of the areas is D50 and a 90% value of cumulative distribution of the areas is D90, 0.1≤D50/D90≤0.8 may be satisfied.

The cumulative distribution of the glass areas, a cumulative function showing the glass areas obtained by measuring areas occupied by the glass portions 3 in the external electrodes 31 and 32 according to size, may be represented by a distribution curve.

In the cumulative distribution of the glass areas, a 50% value thereof may be represented by D50, and a 90% value thereof may be represented by D90.

The areas (A1, A2, . . . , and An) occupied by the glass portions 3 in the external electrodes 31 and 32 may be measured from an image obtained by scanning a cross-section of the ceramic body 10 in a length direction thereof using the SEM, as shown in FIG. 2.

More specifically, the areas (A1, A2, . . . , and An) occupied by the glass portions 3 in the external electrode may be obtained from the cross-section of the external electrode extracted from the image obtained by scanning the cross section of the ceramic body 10 in the length and thickness (L-T) directions taken in the central portion of the ceramic body 10 in the width (W) direction thereof using the SEM, as shown in FIG. 2.

The measuring of the areas (A1, A2, ..., and An) occupied by the glass portions 3 is not specifically limited. For example, the areas thereof may be measured based on a ratio of the areas occupied by the glass portions to a portion of the cross-section of the external electrode 31 having an area of 150 μm×10 μm.

In addition, the areas (A1, A2, ..., and An) occupied by the glass portions 3 in the external electrode may be measured with respect to the overall area of the external electrode, rather than the 150 μm×10 μm area.

In the cumulative distribution of the glass areas, the glass areas are controlled to satisfy $0.1 \leq D50/D90 \leq 0.8$, such that the permeation of the plating solution may be prevented, whereby a multilayer ceramic capacitor having excellent reliability may be implemented.

In the case in which D50/D90 is less than 0.1, since deviation in the cumulative distribution of the glass areas is large, reliability may be deteriorated due to the permeation of the plating solution.

In addition, in the case in which D50/D90 exceeds 0.8 in the cumulative distribution of the glass areas, capacitive contact properties may be deteriorated due to the deterioration of connectivity between the internal electrodes and the external electrodes.

In the multilayer ceramic electronic component according to the third embodiment of the present invention, when a thickness of the external electrode in the central portion of the ceramic body in the thickness direction is Tc and a thickness of the external electrode at a point spaced apart from a central portion of the capacitance forming part by a distance equal to 25% of a length S of the ceramic body in the thickness direction is T1, $T1/Tc \geq 0.8$ may be satisfied.

Since the other characteristics of the multilayer ceramic electronic component according to the third embodiment of the present invention are the same as those of the multilayer ceramic electronic component according to the first and second embodiments, a description thereof will be omitted.

Figure 6:
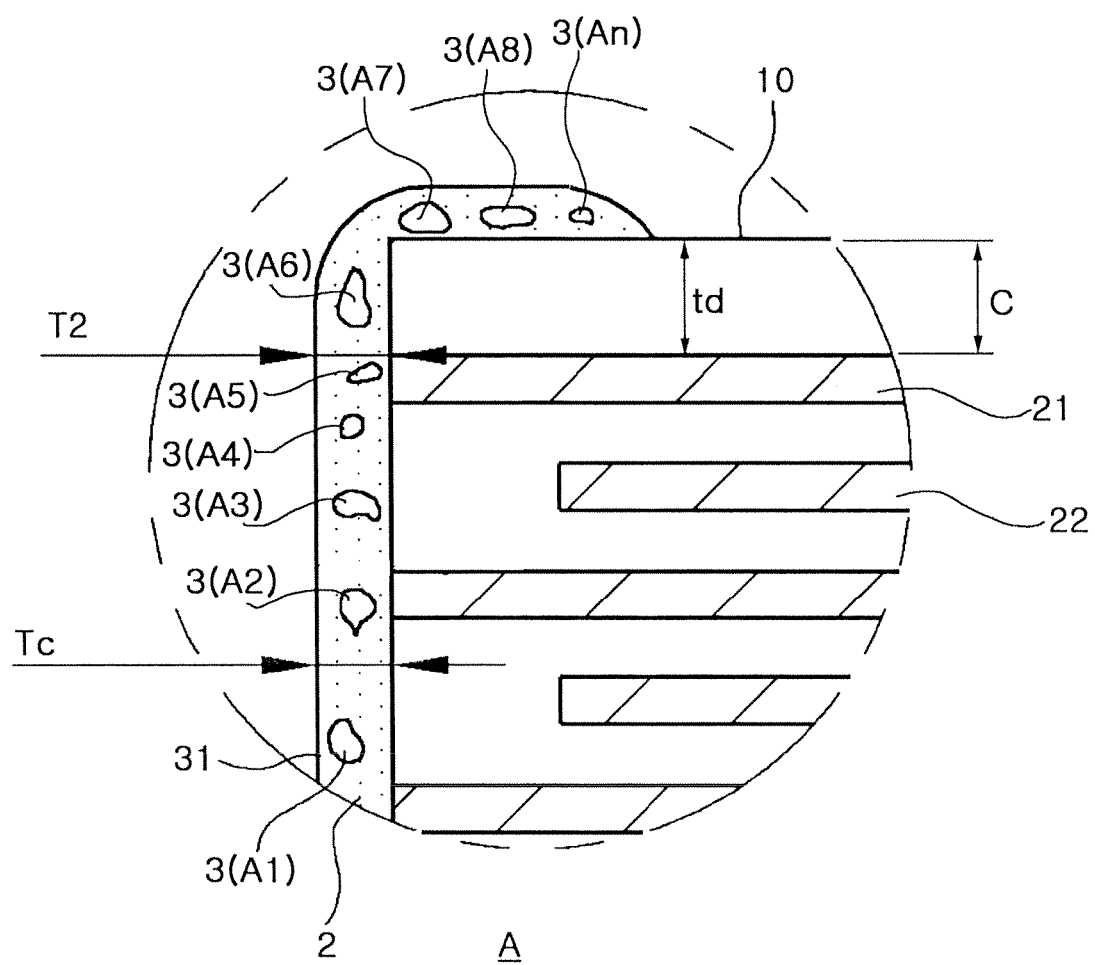
FIG. 6 is an enlarged view of part A of FIG. 2 according to the fourth embodiment of the present invention.

FIG. 6 is an enlarged view of part A of FIG. 2 according to the fourth embodiment of the present invention.

Referring to FIG. 6, in a multilayer ceramic electronic component according to the fourth embodiment of the present invention, an average thickness td of the cover layer C in the cross-section of the ceramic body 10 in the length and thickness (L-T) directions taken in the central portion of the ceramic body 10 in the width (W) direction is 15 μm or less, the external electrodes 31 and 32 include the conductive metal 2 and the glass portions 3, and in the case in which areas of the external electrodes 31 and 32 occupied by the glass 3 portions are A1, A2, ..., and An, when a 50% value of cumulative distribution of the areas is D50 and a 90% value of cumulative distribution of the areas is D90, $0.1 \leq D50/D90 \leq 0.8$ may be satisfied, and when a thickness of the external electrodes 31 and 32 in the central portion of the ceramic body 10 in the thickness direction is Tc and a thickness of the external electrodes 31 and 32 at the outermost point of the capacitance forming part at which the plurality of internal electrodes 21 and 22 are formed is T2, $T2/Tc \geq 0.5$ may be satisfied.

Since the characteristics of the multilayer ceramic electronic component according to the fourth embodiment of the present invention are the same as those of the multilayer ceramic electronic components according to the first to third embodiments, a description thereof will be omitted.

A multilayer ceramic electronic component according to a fifth embodiment of the present invention may include: a ceramic body 10 including a dielectric layer 1; a plurality of internal electrodes 21 and 22 disposed within the ceramic body 10 to face each other, having the dielectric layer 1 interposed therebetween; and external electrodes 31 and 32 electrically connected to the plurality of internal electrodes 21 and 22, wherein the ceramic body 10 includes an active layer corresponding to a capacitance forming part and a cover layer C formed on at least one of an upper surface and a lower surface of the active layer and corresponding to a non-capacitance forming part, an average thickness td of the cover layer C in a cross-section of the ceramic body 10 in length and thickness (L-T) directions taken in a central portion of the ceramic body 10 in a width (W) direction is 15 μm or less, the external electrodes 31 and 32 include a conductive metal 2 and glass portions 3, when an average length of the glass portions 3 in a length direction of the external electrodes 31 and 32 is LS, $Ls \leq 10$ μm may be satisfied, and in a case in which areas of the external electrodes 31 and 32 occupied by the glass portions 3 are A1, A2, ..., and An, when a 50% value of cumulative distribution of the areas is D50 and a 90% value of cumulative distribution of the areas is D90, $0.1 \leq D50/D90 \leq 0.8$ may be satisfied.

In addition, in the multilayer ceramic electronic component according to the fifth embodiment of the present invention, in the case in which a thickness of the external electrode in the central portion of the ceramic body in the thickness direction thereof is Tc and a thickness of the external electrode at a point spaced apart from a central portion of the capacitance forming part by a distance equal to 25% of a length S of the ceramic body in the thickness direction is T1, $T1/Tc \geq 0.8$ may be satisfied.

In a multilayer ceramic electronic component according to a sixth embodiment of the present invention, an average thickness td of the cover layer C in a cross-section of the ceramic body 10 in length and thickness (L-T) directions taken in a central portion of the ceramic body 10 in a width (W) direction is 15 μm or less, the external electrodes 31 and 32 include a conductive metal 2 and glass portions 3, when an average length of the glass portions 3 in a length direction of the external electrodes 31 and 32 is LS, $Ls \leq 10$ μm may be satisfied, in a case in which areas of the external electrodes 31 and 32 occupied by the glass portions 3 are A1, A2, ..., and An, when a 50% value of cumulative distribution of the areas is D50 and a 90% value of cumulative distribution of the areas is D90, $0.1 \leq D50/D90 \leq 0.8$ may be satisfied, and when a thickness of the external electrodes 31 and 32 in the central portion of the ceramic body 10 in the thickness direction is Tc and a thickness of the external electrodes 31 and 32 at the outermost point of the capacitance forming part at which the plurality of internal electrodes 21 and 22 are formed is T2, $T2/Tc \geq 0.5$ may be satisfied.

Since the characteristics of the multilayer ceramic electronic components according to the fifth and sixth embodiments of the present invention are the same as those of the multilayer ceramic electronic components according to the first to fourth embodiments, a description thereof will be omitted.

Hereinafter, a method of fabricating the multilayer ceramic electronic components according to the first to sixth embodiments of the present invention will be described in detail. In particular, a multilayer ceramic capacitor will be described. However, the present invention is not limited thereto.

First, the ceramic body 10 including the dielectric layer 1 and the plurality of internal electrodes 21 and 22 disposed to face each other, having the dielectric layer 1 therebetween, may be prepared.

The dielectric layer 1 may be formed of a ceramic green sheet prepared to have a thickness of several μm by applying a slurry formed by mixing a powder such as a barium titanate (BaTiO$_3$) powder, or the like, with a ceramic additive, an organic solvent, a plasticizer, a binder, and a dispersant using a basket mill to a carrier film and drying the same.

Then, the internal electrode may be formed by dispensing a conductive paste on the green sheet and moving a squeegee in a single direction.

Here, the conductive paste may be formed of one of precious metal such as silver (Ag), lead (Pb), platinum (Pt), or the like, nickel (Ni), and copper (Cu) or a mixture of at least two materials thereof.

After the internal electrodes are formed as described above, a laminated body may be formed by separating the green sheet from the carrier film and then laminating a plurality of green sheets in an overlapping scheme.

Then, a ceramic body may be fabricated by compressing the laminated body at high temperature and high pressure and then cutting the compressed laminated body to have a predetermined size.

Next, an external electrode paste including a conductive metal and glass may be prepared.

The conductive metal may be at least one selected from a group consisting of copper (Cu), nickel (Ni), silver (Ag), and sliver-palladium (Ag—Pd).

In addition, the glass may be insulating glass, but is not limited thereto.

Next, the external electrode paste may be applied to the ceramic body 10 to be electrically connected to the plurality of internal electrodes 21 and 22.

Lastly, the external electrodes 31 and 32 may be formed by sintering the ceramic body 10.

Hereinafter, although the present invention will be described in detail with reference to Comparative and Inventive Examples, the present invention should not be construed as being limited thereto.

The present embodiment was practiced in order to test reliability according to an average thickness td of the cover layer C in a cross-section of a ceramic body in length and thickness (L-T) directions taken in a central portion of the ceramic body in a width (W) direction thereof, an average length Ls of glass portions in a length direction of external electrodes and a ratio of a 50% value (D50) of cumulative distribution of glass areas to a 90% value (D90) thereof.

The multilayer ceramic capacitor according to the present embodiment was fabricated as follows.

First, a slurry containing a powder such as a barium titanate (BaTiO$_3$) powder, or the like, was applied to a carrier film and dried to prepare a plurality of ceramic green sheets, thereby forming a dielectric layer.

Next, a conductive paste for internal electrodes in which an average size of nickel particles is 0.05 to 0.2 μm was prepared.

The conductive paste for internal electrodes was applied to the green sheets using a screen printing method to thereby form internal electrodes and 50 layers of green sheets were then laminated to thereby form a laminated body.

Then, the laminated body was compressed and cut to thereby form a chip having a 0603 standard size, and the chip was sintered at a temperature of 1050 to 1200° C. under a reducing atmosphere in which H$_2$ was 0.1% or less.

Next, external electrodes were formed and processes such as a plating process, and the like were performed on the external electrodes to thereby fabricate a multilayer ceramic capacitor.

The following table 1 shows reliability comparison results according to the average thickness td of the cover layer C in the cross-section of the ceramic body in the length and thickness directions taken in the central portion of the ceramic body in the width direction.

The multilayer ceramic capacitor was fabricated to allow the ratio of the 50% value (D50) of cumulative distribution of the glass areas to the 90% value (D90) thereof to be outside of the numerical range of the present invention, for example, the ratio was 0.02, and then testing was performed.

In addition, reliability was measured by a high temperature acceleration lifespan test, and the number of defects generated under conditions of 130° C., 1.5 Vr (9.45 V), and 6 hours was evaluated.

TABLE 1

| Sample | Average Thickness (td) of Cover Layer (μm) | Reliability Defects (Number of Defects/Total Number) |
|---|---|---|
| 1 | 50 | 0/40 |
| 2 | 30 | 0/40 |
| 3 | 16 | 0/40 |
| 4* | 15 | 1/40 |
| 5* | 13 | 2/40 |

Referring to Table 1, it may be appreciated that in samples 1 to 3 corresponding to the cases in which the average thickness of the cover layer was 50 μm, 30 μm, and 16 μm, respectively, the thickness of the cover layer was thick, which was not problematic in terms of reliability defects.

Meanwhile, it may be appreciated that in samples 4 and 5 corresponding to the cases in which the average thickness of the cover layer was 15 μm or less, the thickness of the cover layer was thin, such that the ratio (D50/D90) of the 50% value (D50) of cumulative distribution of the glass areas to the 90% value (D90) thereof was outside of the numerical range of the present invention, causing reliability problem.

Therefore, it may be appreciated that in the multilayer ceramic electronic component according to the present embodiment of the present invention having the average thickness of the cover layer of 15 μm or less, reliability could be improved only in the case in which the ratio (D50/D90) of the 50% value (D50) of cumulative distribution of the glass areas to the 90% value (D90) thereof satisfies the numerical range of the present invention.

The following Table 2 shows comparison results as to whether or not the plating solution is permeated into the multilayer ceramic capacitor according to the average length Ls of the glass portions in the length direction of the external electrodes, and the ratio (D50/D90) of the 50% value (D50) of cumulative distribution of the glass areas to the 90% value (D90) thereof.

In addition, testing was performed under conditions in which the average thickness of the cover layer was 15 μm.

TABLE 2

| | Average Length (Ls) of Glass Portions in Length Direction of External Electrodes (μm) | Ratio (D50/D90) of 50% Value (D50) of Cumulative Distribution of Glass Areas and 90% Value (D90) Thereof | Permeation of Plating Solution (Number of Permeation/Total Number) |
|---|---|---|---|
| Inventive Example 1 | 1 | 0.8 | 0/100 |
| Inventive Example 2 | 3 | 0.45 | 0/100 |
| Inventive Example 3 | 6 | 0.20 | 0/100 |
| Inventive Example 4 | 8 | 0.15 | 0/100 |
| Inventive Example 5 | 9 | 0.11 | 0/100 |
| Inventive Example 6 | 10 | 0.1 | 0/100 |
| Comparative Example 1 | 11 | 0.08 | 1/100 |
| Comparative Example 2 | 12 | 0.05 | 3/100 |
| Comparative Example 3 | 15 | 0.04 | 10/100 |

Referring to Table 2, it may be appreciated that Comparative Examples 1 to 3, corresponding to the cases in which the average length Ls of the glass portions in the length direction of the external electrodes and the ratio (D50/D90) of the 50% value (D50) of cumulative distribution of the glass areas and the 90% value (D90) thereof were outside of the numerical range of the present invention, were problematic in terms of reliability.

Meanwhile, it may be appreciated that Inventive Examples 1 to 6, corresponding to the cases in which the average length Ls of the glass portions in the length direction of the external electrodes and the ratio (D50/D90) of the 50% value (D50) of cumulative distribution of the glass areas and the 90% value (D90) thereof satisfy the numerical range of the present invention, had no defects due to the permeation of the plating solution and showed excellent results in terms of reliability.

Consequently, according to the embodiments of the present invention, in the case in which the average thickness of the cover layer is 15 μm or less, when the average length Ls of the glass portions in the length direction of the external electrodes and the ratio (D50/D90) of the 50% value (D50) of cumulative distribution of the glass areas and the 90% value (D90) thereof satisfy the numerical range of the present invention, the permeation of the plating solution may be prevented, whereby a multilayer ceramic electronic component having excellent reliability may be implemented.

As set forth above, according to embodiments of the present invention, a multilayer ceramic electronic component has improved reliability by preventing the permeation of a plating solution.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic body including a dielectric layer;
a plurality of internal electrodes disposed within the ceramic body to face each other, having the dielectric layer interposed therebetween; and
external electrodes electrically connected to the plurality of internal electrodes,
wherein the ceramic body includes an active layer corresponding to a capacitance forming part and a cover layer formed on at least one of an upper surface and a lower surface of the active layer and corresponding to a non-capacitance forming part,
an average thickness of the cover layer in a cross-section of the ceramic body in length and thickness directions taken in a central portion of the ceramic body in a width direction is 15 gm or less,
the external electrodes include a conductive metal and glass portions,
when an average length of the glass portions in a length direction of the external electrodes is Ls, Ls≤10 μm is satisfied, and
when a thickness of the external electrode in the central portion of the ceramic body in the thickness direction is Tc and a thickness of the external electrode at a point spaced apart from a central portion of the capacitance forming part by a distance equal to 25% of a length of the ceramic body in the thickness direction is T1, T1/Tc≥0.8 is satisfied.

2. The multilayer ceramic electronic component of claim 1, wherein when a thickness of the external electrode in the central portion of the ceramic body in the thickness direction is Tc and a thickness of the external electrode at the outermost point of the capacitance forming part at which the plurality of internal electrodes are formed is T2, T2/Tc≥0.5 is satisfied.

3. The multilayer ceramic electronic component of claim 1, wherein the glass portions include glass particles having an average particle diameter of 2 μm or less.

4. The multilayer ceramic electronic component of claim 1, wherein the conductive metal is at least one selected from a group consisting of copper (Cu), nickel (Ni), silver (Ag), and silver-palladium (Ag—Pd).

5. The multilayer ceramic electronic component of claim 1, wherein the glass portions have insulating properties.

6. A multilayer ceramic electronic component comprising:
a ceramic body including a dielectric layer;
a plurality of internal electrodes disposed within the ceramic body to face each other, having the dielectric layer interposed therebetween; and
external electrodes electrically connected to the plurality of internal electrodes,
wherein the ceramic body includes an active layer corresponding to a capacitance forming part and a cover layer formed on at least one of an upper surface and a lower surface of the active layer and corresponding to a non-capacitance forming part,
an average thickness of the cover layer in a cross-section of the ceramic body in length and thickness directions taken in a central portion of the ceramic body in a width direction is 15 μm or less,
the external electrodes include a conductive metal and glass portions,
when a 50% value of cumulative distribution of areas occupied by the glass portions in the external electrodes is D50 and a 90% value of cumulative distribution of the areas is D90, 0.1≤D50/D90≤0.8 is satisfied, and
when a thickness of the external electrode in the central portion of the ceramic body in the thickness direction is Tc and a thickness of the external electrode at a point spaced apart from a central portion of the capacitance forming part by a distance equal to 25% of a length of the ceramic body in the thickness direction is T1, T1/Tc≥0.8 is satisfied.

7. The multilayer ceramic electronic component of claim 6, wherein when a thickness of the external electrode in the central portion of the ceramic body in the thickness direction is Tc and a thickness of the external electrode at the outermost point of the capacitance forming part at which the plurality of internal electrodes are formed is T2, T2/Tc≥0.5 is satisfied.

8. The multilayer ceramic electronic component of claim 6, wherein the glass portions include glass particles having an average particle diameter of 2 μm or less.

9. The multilayer ceramic electronic component of claim 6, wherein the conductive metal is at least one selected from a group consisting of copper (Cu), nickel (Ni), silver (Ag), and silver-palladium (Ag—Pd).

10. The multilayer ceramic electronic component of claim 6, wherein the glass portions have insulating properties.

11. A multilayer ceramic electronic component comprising:
   a ceramic body including a dielectric layer;
   a plurality of internal electrodes disposed within the ceramic body to face each other, having the dielectric layer interposed therebetween; and
   external electrodes electrically connected to the plurality of internal electrodes,
   wherein the ceramic body includes an active layer corresponding to a capacitance forming part and a cover layer formed on at least one of an upper surface and a lower surface of the active layer and corresponding to a non-capacitance forming part,
   an average thickness of the cover layer in a cross-section of the ceramic body in length and thickness directions taken in a central portion of the ceramic body in a width direction is 15 μm or less,
   the external electrodes include a conductive metal and glass portions,
   when an average length of the glass portions in a length direction of the external electrodes is Ls, Ls≤10 μm is satisfied, and
   when a 50% value of cumulative distribution of areas occupied by the glass portions in the external electrodes is D50 and a 90% value of cumulative distribution of the areas is D90, 0.1≤D50/D90≤0.8 is satisfied, and
   when a thickness of the external electrode in the central portion of the ceramic body in the thickness direction is Tc and a thickness of the external electrode at a point spaced apart from a central portion of the capacitance forming part by a distance equal to 25% of a length of the ceramic body in the thickness direction is T1, T1/Tc≥0.8 is satisfied.

12. The multilayer ceramic electronic component of claim 11, wherein when a thickness of the external electrode in the central portion of the ceramic body in the thickness direction is Tc and a thickness of the external electrode at the outermost point of the capacitance forming part at which the plurality of internal electrodes are formed is T2, T2/Tc≥0.5 is satisfied.

13. The multilayer ceramic electronic component of claim 11, wherein the glass portions include glass particles having an average particle diameter of 2 μm or less.

14. The multilayer ceramic electronic component of claim 11, wherein the glass portions have insulating properties.

* * * * *